United States Patent [19]
Tang et al.

[11] Patent Number: 5,828,960
[45] Date of Patent: Oct. 27, 1998

[54] METHOD FOR WIRELESS COMMUNICATION SYSTEM PLANNING

[75] Inventors: Yuqiang Tang, Plano; John Douglas Reed, Arlington, both of Tex.

[73] Assignee: Motorola, Inc., Schaumburg, Ill.

[21] Appl. No.: 415,051

[22] Filed: Mar. 31, 1995

[51] Int. Cl.[6] .............................. H04B 17/00; H04Q 7/00; H04Q 9/00

[52] U.S. Cl. ......................... 455/446; 455/429; 455/67.1; 364/550

[58] Field of Search ............................... 455/62, 63, 67.1, 455/33.1, 446–449, 429, 444, 524, 568; 379/59; 364/514

[56] References Cited

U.S. PATENT DOCUMENTS 5,450,615   9/1995   Fortune et al. ......................... 455/67.6

OTHER PUBLICATIONS

Henry L. Bertoni, Fellow, IEEE, Walter Honcharenko, Member, IEEE, Leandro Rocha Maciel, and Howard H. Xia, "UHF Propagation Prediction for Wireless Personal Communications", Proceedings of the IEEE, Sep. 1994, pp. 1333–1359.

Jorgen Bach Andersen, Theodore S. Rappaport, and Susumu Yoshida, "Propagation Measurements and Models for Wireless Communications Channels", IEEE Communications, Jan. 1995 vol. 33 No. 1 pp. 42–49.

Murch and Wong, "Microcell Propagation Prediction Techniques," ICCS 94, pp. 1–5, 1994.

Takahashi et al., "An Evaluation Point Culling Algorithm for Radio Propagation Simulation Based on the Imaging Method," Wireless Personal Communications, KAP, pp. 111–121, 1996.

Brown et al., "Investigations on the Prediction of Radiowave Propagation in Urban Microcell Environments Using Ray-tracing Techniques," IEE Proceedings, pp. 36–42, Feb. 1996.

Sanchez et al., "Exhaustive Ray Tracing Algorithm for Microcellular Propagation Prediction Models," Electronics Letters, vol. 32, No. 7, pp. 624–625, Mar. 28, 1996.

McKown et al., "Ray Tracing as a Design Tool for Radio Networks," IEEE Network Mag., pp. 27–30, Nov. 1991.

*Primary Examiner*—Douglas W. Olms
*Assistant Examiner*—David R Vincent
*Attorney, Agent, or Firm*—Richard A. Sonnentag

[57] ABSTRACT

A method for wireless communication system planning includes, in a first embodiment, determining an image tree (500), based on a transmitter location (401) and the reflective (415) and diffractive (425) surfaces within a coverage region, and limiting the image tree to exclude branching for higher order images requiring more than a predetermined number of reflections and/or diffractions, or potential child images corresponding to surfaces not within the scope of the parent image (530, 560). Based on the image tree and propagation path back-tracing (620) a received signal quality measure (e.g., power) is determined for each receive location. By comparing the different received signal powers an optimal receiver unit location is determined. Further, by building further image trees for further transmitter locations, an overall coverage quality can be determined for each transmitter and compared to yield an optimal transmitter location.

18 Claims, 5 Drawing Sheets

METHOD FOR WIRELESS COMMUNICATION SYSTEM PLANNING

FIELD OF THE INVENTION

The present invention relates, in general, to wireless communication systems and, more particularly, to a method for wireless communication system planning using ray-tracing.

BACKGROUND OF THE INVENTION

In a wireless communication system such as cellular or Personal Communications Services, base stations are located such that radio signals are available through out the service area. To obtain near seamless coverage, many cells are required. Predicting the coverage of such cells is a difficult job, and a number of tools have been developed which make some use of terrain data, with building clutter information, such as that available by the US Geological Survey within the United States. This data is used in conjunction with models that are well known in the art, such as the Longley-Rice model which uses base and subscriber heights, along with a description of the terrain to calculate a prediction of the expected propagation loss for the locations under consideration.

This method works sufficiently well for large cells whose base antenna is well above the building clutter, so the influence of particular buildings/structures or groups of buildings is minimal. When the base station antennas are near rooftop level or below building rooftops, then the actual size and shape of the buildings influences the signals as they propagate down the streets and diffract around corners. These cells, generally called microcells, typically cover a much smaller area, especially in dense urban areas. Tools to predict micro-cell coverage typically use information about the building sizes, shapes, and sometimes material types to aid in modeling the propagation paths in and around the buildings in the coverage area.

A deterministic process, as opposed to the above statistical process, basically attempts to model the radiowave propagation as rays radiating from the transmitter to the receiver. This approach can be effective and accurate when the objects in the modeled environment are much larger in dimension than the wave length of the transmitted signal. The propagation phenomena that can be modeled in a ray-tracing process include reflection, diffraction, transmission and the combinations of the above. Within ray tracing there are two generally known approaches. The first is called the "shooting-and-bouncing" method, in which a fixed number of rays are launched from the source (transmitter), then forward-traced to follow the different propagation paths, with a ray being terminated when it hits a detection sphere at the receiver. A major advantage of this approach is that it can be applied to most any type of surface. A key disadvantage is that for every receiver location, the rays have to be launched and traced again in all directions. This could mean hours or even days of computation time for a practical environment.

The second method is based on image theory, which is traditionally limited to more or less planar surfaces in the environment. The basic notion here is that the images of a source at a fixed location in a given environment are independent of the location of the point of observation (receiver) as long as there are basically planar surfaces in the environment. Therefore one can build all the images for a given location of the source and environment and reuse it for as many receiver locations as one needs. This represents an improvement in terms of computational efficiency, but of course, one is limited by the planar surfaces in the environment. This is, however, typical of an urban microcellular environment. Thus, a conventional image theory approach may be advantageously used for microcells, with one first determining an image tree (hierarchically organized for ease of use) based on the location of the source in the environment and the environment itself. The environment consists of mirrors (or reflective surfaces) and corners. Starting from the source image, each mirror or corner has the potential of generating a "child" image from the source image. Each child image can further generate child images for every mirror and every corner. Once the image tree is built, for a given receiver location every image on the tree needs to be examined to see whether it contributes to the total received power through a back-tracing process from the receiver to the transmitter.

However, a key problem with image tracing is the size of the image tree for a realistic environment, leading to very large computational and memory requirements. The following example illustrates the problem. In an environment defined by N mirrors, there are also (typically) approximately N corners. Each of the N mirrors can potentially generate a reflective image, and each of the N corners can potentially generate a diffractive image. Without some limitation on the growth of the image tree, a source with m levels of reflection and n levels of diffraction will generate on the order of $(2N)^n N^{(m-n)}$ images, assuming m>n. For example, if N=100, m=3, n=1, then a conventional image tree will include about 2,000,000 images. If each image object takes 100 bytes of memory (i.e., in order to hold its own attributes and pointers to its ancestor image and descendant images), the total memory needed to hold the above image tree with fairly modest assumptions is 200 megabytes! Given the number of images involved, it is typical for the process of determining transmitter/receiver placements to take days or even weeks, depending on the number of buildings or other structures, the size of the coverage area, and the resolution of the calculated grid of predicted points.

There remains therefore a need for an improved method of ray tracing which compensates for these and other problems.

DETAILED DESCRIPTION OF THE DRAWINGS

These and other problems are solved by the method for system planning in accordance with the invention. This method, described further below, is particularly advantageous since most conventional ray tracing processes use image trees consisting of large numbers of unenergized images. If one can determine whether an image is energized or not before generating that image, one can generate and store images for the energized portions only. Not only is memory saved; there is also a reduction in searching time consumed in later processing and placement determination. However, even with such "pruning" of the image tree, there are still a fairly large number of images on the image tree for a realistic urban environment (e.g., 50,000). To determine the received signal for a given receiver location, therefore an improved back-tracing process is preferably performed for every image on the image tree. By repeating this process for other receive locations, an estimate of the coverage quality for the given transmitter may be obtained, from which optimal transceiver placement can be determined. All this can be performed at significant savings in memory and processing time over prior methods due to the improvement of the present invention.

A preferred method for determining signal propagation characteristics for the known environment (e.g., microcell or in-building) starts with minimizing the size of (i.e., pruning) the image tree by defining a scope for each image on the image tree. A "scope" is defined as an angle within which the majority of the radiated energy from the image is confined. The source image, of course, has a predetermined scope angle-typically 360 degrees, but it could be a set lesser amount if directed (e.g., so as not to transmit towards an immediately adjacent wall, or for sectorized antennas). The scope angle of a reflective image, however, is usually much less than 180 degrees. Typically, the scope angle of a diffractive image is usually less than 45 degrees. When the image tree is built for a given environment and source location, a scope attribute is specified every time an new image is created. New images are only created for those mirrors and corners that fall within the scope of an image. By defining the scope angle and mapping out only the energized portion of the image tree, the size of the resultant image tree is greatly reduced. This in turn saves the memory needed to store the images, and increases the speed of computation for received power and other data.

Subsequently, the inherent information in the hierarchy of the image tree is preferably used to partially trace the image tree based on a received signal level (or similar propagation/ quality measure, including signal power loss). For any image on the image tree, its reflective child image contributes less power compared to the parent image due to the extra reflection. The difference can be 14 dB or more for realistic environments. On the other hand a diffracted child image typically contributes at least 6 dB less power than the parent image, and usually a lot less. Therefore by setting an absolute and a relative signal level threshold, the received signal level from the current image can be compared to the threshold and the current total received power, and decisions made whether or not to examine the child images of the current image. Thus, partial examination of the image tree for the computation of the summed signal level at a given location is accomplished. This reduces the time needed to calculate the signal power for each possible receiver location.

Figure 1:
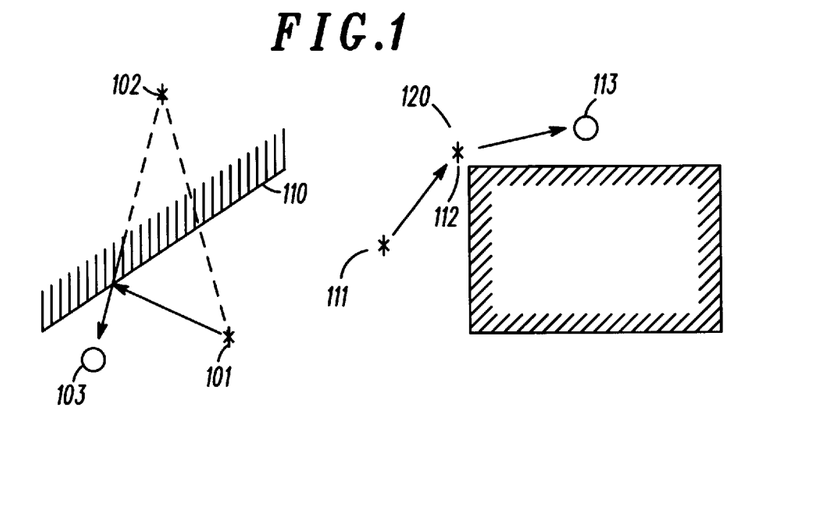
FIG. 1 is a diagram illustrating how a reflective image is generated for a reflective surface of "mirror," and how a diffractive image is generated for a diffractive surface or "corner," in accordance with a preferred embodiment of the invention.

Referring initially to FIG. 1, image generation is generally illustrated, showing how a reflective image 103 is generated on a mirror 110, and how a diffractive image 113 is generated on a corner 120. A source (s) 101 can create a reflective image (i) 102 behind the mirror 110, which defines the path of the reflected ray from the source to the receiver 103 if a receiver location is defined. Notice that the location of the image 102 is independent of the location of the receiver 103. A source (s) 111 can also create a diffractive image (i) 112 at a diffracting corner 120, which defines a diffracted path from the transmitter to the receiver 113 if the location of the receiver is defined. Again, the location of the diffractive image 112 is independent of the location of the receiver 113.

Figure 2:
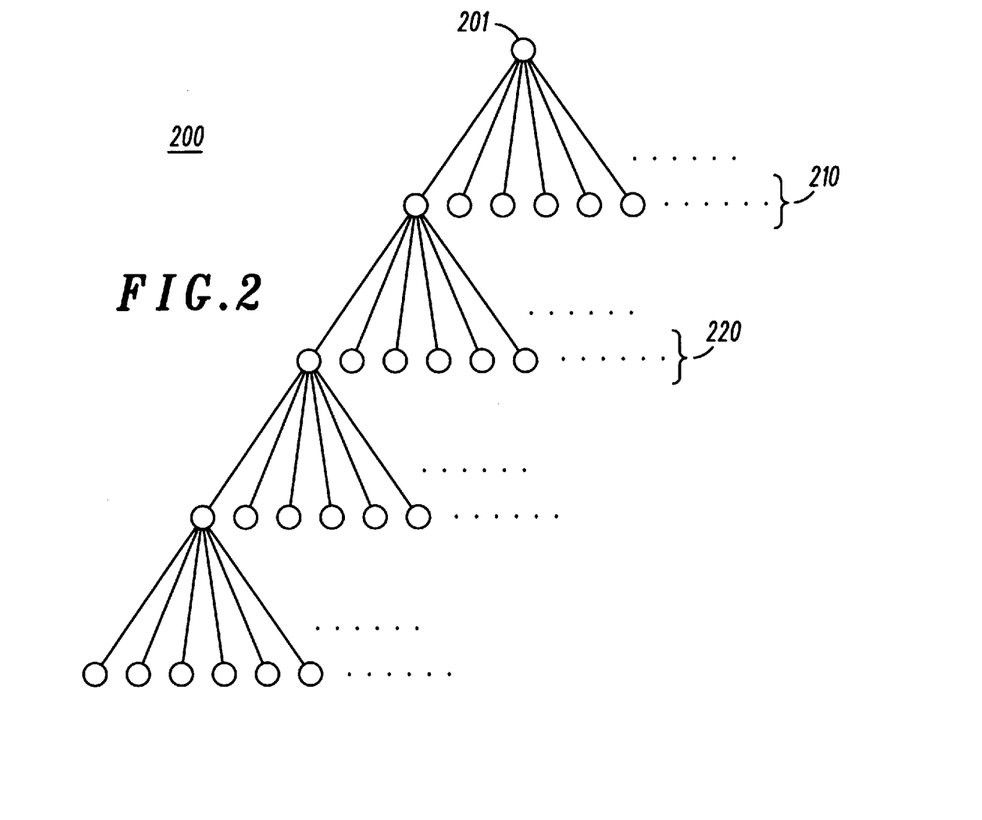
FIG. 2 is a diagram illustrating a hierarchical view of an image tree for a given environment and source.

FIG. 2, generally depicts the hierarchy of an image tree (generally designated 200). For a given environment and a given source location, the source 201 can generate for every mirror in the environment a reflected child image, and for every corner in the environment a diffractive image. These are called first generation (or first order) images 210. Each first generation image can in turn act like the source image and generate for every mirror in the environment a reflected child image, and for every corner in the environment a diffractive image. These are called second generation or second order images 220. This process can be repeated for second and higher order images and stopped after a predetermined number of reflections and diffractions is reached. The images generated in this process are then linked together to form a hierarchical image tree 200.

If the given transmitter TX is the head of the image tree, i.e. the source 201, and A is an image somewhere in the tree, whether reflective or diffractive, and if B is a reflective child of image A, then the power contribution from image B is less by an amount equal to the loss due to the reflection plus the extra free space loss below that from image A. For real environments this is at least 14 dB plus the difference in free space loss (determined based on the path segment length from a reflective/diffractive surface corresponding to image A and a reflective point on the surface corresponding to image B—e.g., the distance between r1 312 and r2 322 of FIG. 3). In the same way, if C is a diffractive image of A, then the power contribution of image C is a loss of at least 6 dB (usually much more than 6 dB) plus the difference in free space loss below that of image A. If the power contribution of image A is already below a given threshold, then there is no need to check B and C and their siblings and descendants, so the image tree can be further pruned.

Figure 3:
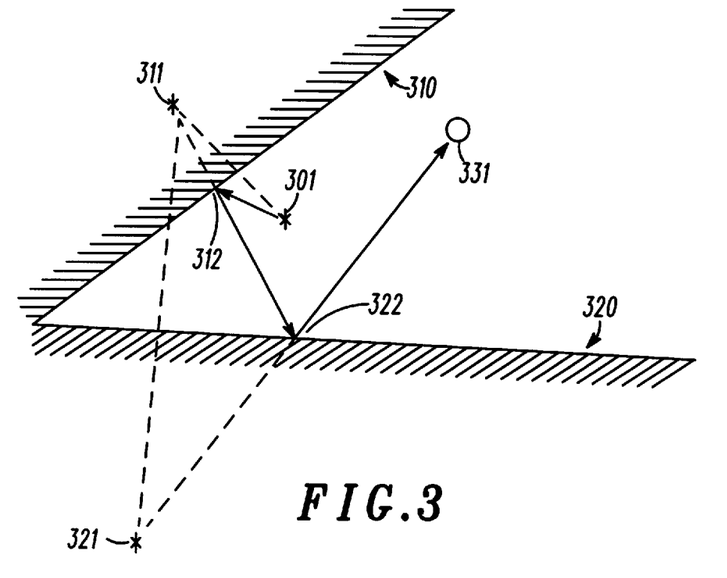
FIG. 3 is a diagram illustrating "back-tracing" of an image on the image tree from the receiver to the transmitter.

Turning to FIG. 3, "back-tracing" of an image is illustrated, i.e., tracing an image tree back from the receiver 331 to the transmitter 301. When the receiver's location is known, each of the images on the image tree may be examined to see whether it lies on a propagation path between the transmitter 301 and the receiver 331. This is done by back-tracing. Starting from the receiver (RX) 331, a propagation line is first drawn between the second generation image (aa) 321 and RX 331, from which a point of reflection (r2) 322 on the surface (mirror 320) is found. If r2 322 is not on mirror 320 or the line-of-sight (LOS) path between RX 331 and r2 322 is blocked, then this image does not constitute a possible propagation path. Otherwise a line or ray is drawn between r2 322 and (a), which is the parent image 311 of the image aa 321. Another point of reflection (r1) 312 on surface 310 is then found. Again, if (r1) 312 is not on mirror 310 or the LOS path between (r2) 322 and (r1) 312 is blocked, then this image 311 does not constitute a valid propagation path. If the LOS clearance between (r1) 312 and the source (s) 301 (which is the parent image of the image a 311) exists, then there is a propagation path from the source 301 to the receiver RX 331 through two reflection points 312, 322.

Figure 4:
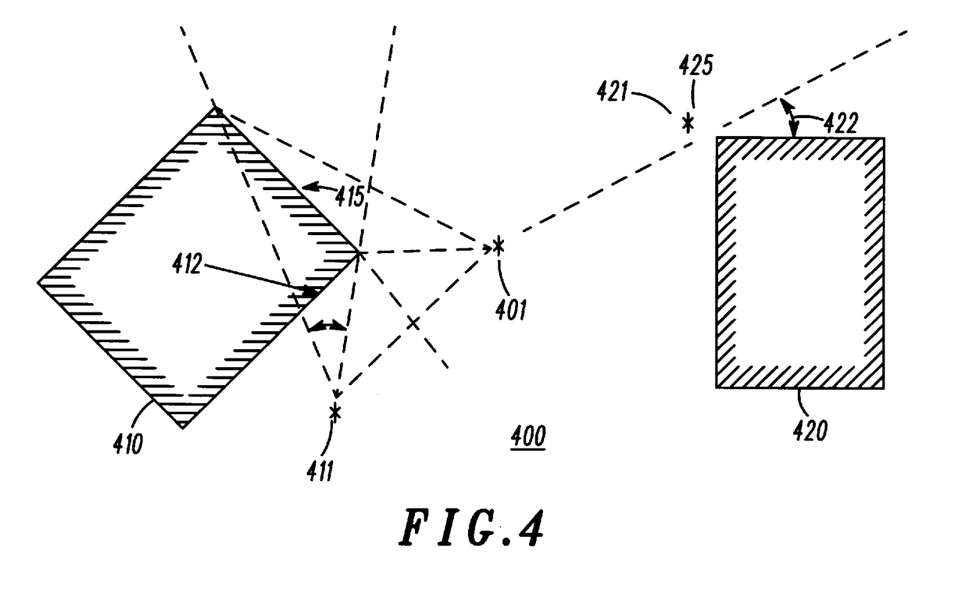
FIG. 4 is a diagram illustrating the use of a scope for both a reflective image and a diffractive image in accordance with the preferred embodiment of the invention.

FIG. 4 generally depicts how a scope can be used in building an image tree in an urban canyon 400. The scope is an angle that defines the energized region of space based on possible propagations from the image. In the case of building 410 having surface 415 (which acts as a mirror in this case), image $i_1$ 411 is the image for any reflections off surface 415 from transmitter source location 401. However, since image $i_1$ 411 can only serve as an image for those rays propagating from surface 415 within the region defined by the scope 412, scope 412 can be used to significantly reduce the possible daughter images of image $i_1$ 411 (i.e., to those images having reflection or diffraction points within the region defined by scope 412). Similarly, in the case of building 420 having surface edge 425 (which acts as a diffraction corner), image $i_2$ 421 is the image for any diffractions off surface 425 from source 401. However, again the image $i_2$ 421 can only serve as an image for those rays propagating from edge 425 within the region defined by the scope 422, and scope 422 can be similarly used to significantly reduce the possible daughter images of image $i_2$ 421 (i.e., to those images having reflection or diffraction points within the region defined by scope 422). In both cases, the scope angles of reflected and diffractive images are much smaller than 360 degrees, which would conventionally be required for the two dimensional case. By only creating child images for surfaces (e.g., mirrors and corners) that are within the scope of the current image, the growth of the image tree will be limited within the energized portion of the potential image tree. This will effectively "prune" the image tree to a manageable size for a realistic environment such as urban microcellular applications.

Figure 5:
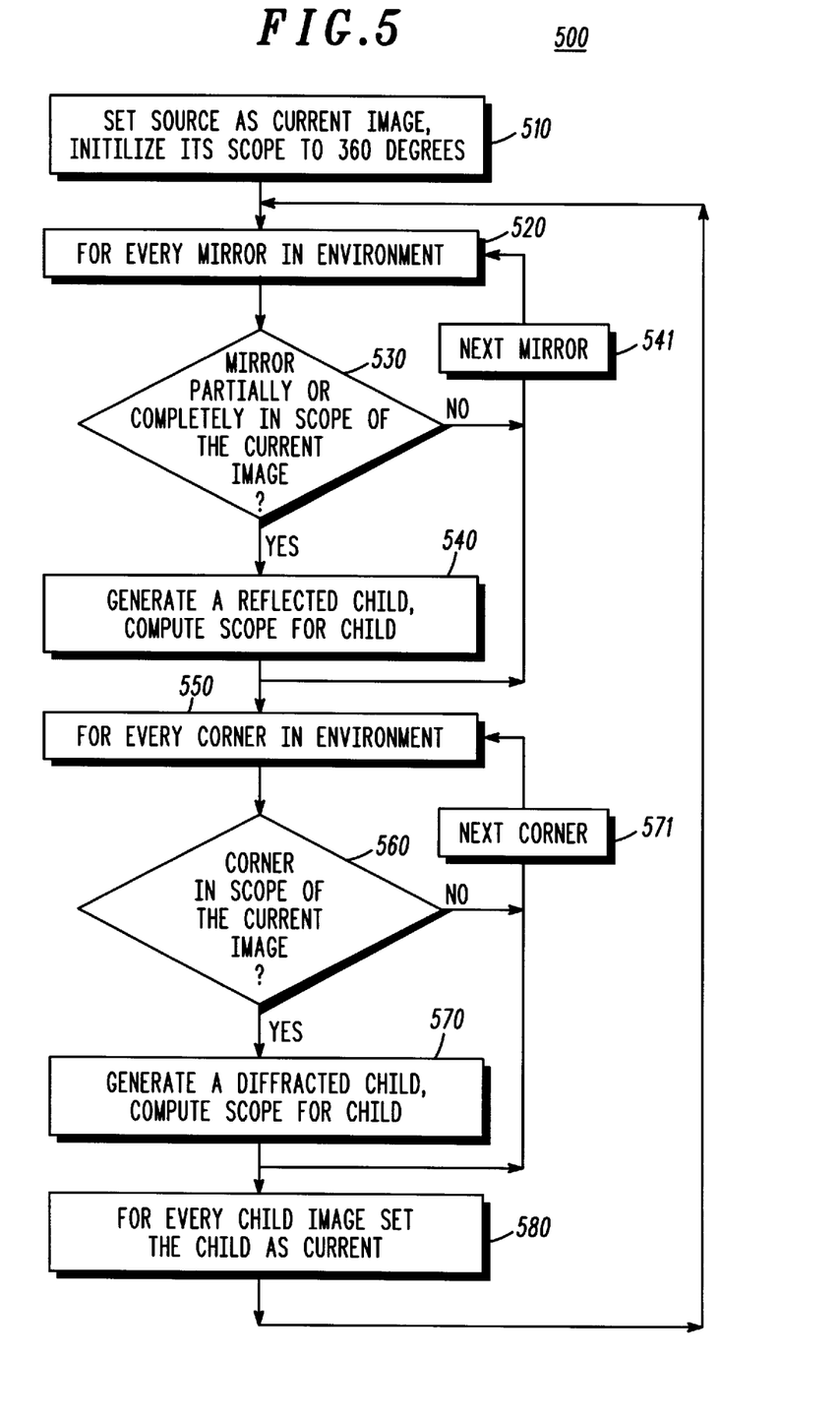
FIG. 5 is a flow diagram illustrating a method for determining an image tree in accordance with the preferred embodiment of the invention.

Next, FIG. 5 generally illustrates a method 500 by which a pruned image tree can be built. First, if it has not already been determined, the location of all significant structures (buildings, towers, terrain, etc.) and any desired structural characteristics (e.g., the location of each of plural reflective surfaces (defining all potential reflective points on the surface) and plural diffractive surfaces, along with signal power loss characteristics) are determined. Then, for a given transmitter source location and known environment (i.e., the structural characteristics, the source is set as the current image, and its predetermined scope set (typically to 360 degrees)) (step 510). Then, for every "mirror" that is in the environment (step 520) a determination is made whether the mirror is partially or completely in the scope (e.g., unobstructed LOS view) of the current image (step 530). If it is, a child image (or first order reflective image) is determined (step 540) (via conventional trigonometry) for that mirror and the scope computed. Next, for every "corner" in the environment (550) a determination is made whether the corner is in the scope of the current image (step 560). If it is, a child image (or first order diffractive image) is determined for that corner and the scope computed (step 570). Finally, the process is repeated for a predetermined number of reflections and diffractions for each branch. For example, if two levels of reflections and three levels of diffractions are desired, the image tree would be five levels deep at that branch; however, all third level reflective images (and their child images), even if third order images, would be pruned. In less dense urban environments, where there will be greater energy loss per reflection/diffraction due to, among other factors, longer paths, determination of two levels of reflection and three levels of diffraction are generally sufficient to adequately model the actual propagation environment. In denser environments an additional level, or perhaps even more, may be necessary. One skilled in the art will appreciate how to choose an appropriate level of image generation based on the environmental density, as well as considerations such as the available memory/processing power (which increase dramatically as each additional level is added).

Figure 6:
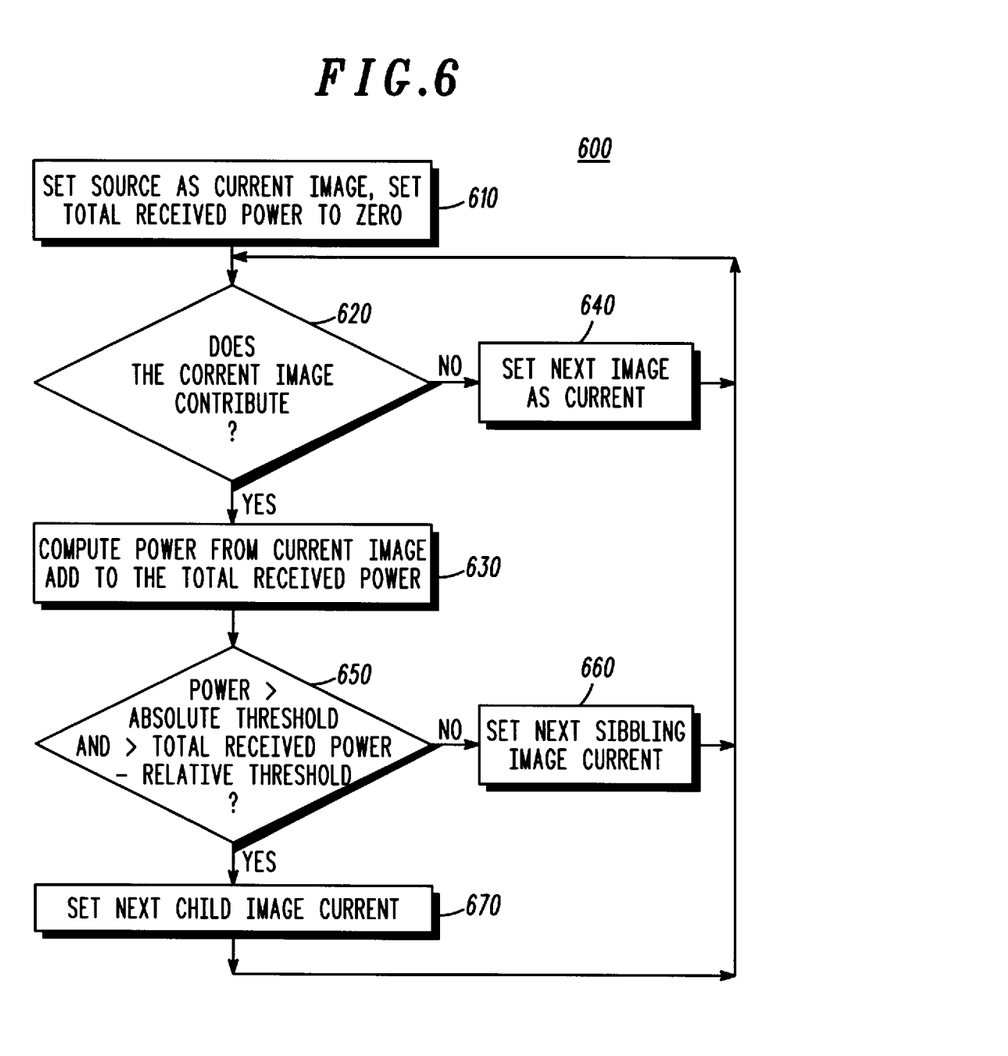
FIG. 6 is a flow diagram illustrating a method for received power estimation in accordance with the preferred embodiment of the invention.

Finally, FIG. 6 generally illustrates a preferred method (600) for back-tracing the images on the image tree and determining a received signal quality measure (e.g., the total received power, propagation loss, etc.) for given receiver locations. First, the process is initialized by starting with the top of the image tree, the transmitter (610). A back-tracing process (such as illustrated in FIG. 3) is performed to determine whether the first receiver location is in a direct line of sight with the transmitter (620). If it is, the path from the transmitter to the receiver forms a first propagation path, and the signal quality change (e.g., power loss, attentuation, or change in another quality measure) across the path, in this case due solely to free space path loss, is determined (630). If not, the next image, preferably in descending order on the image tree, is set as a current image (640).

Thus, following the transmitter the contribution of child image A (of FIG. 2) would be determined (620). If image A is a diffractive image, this would be determined as for the transmitter, i.e., whether a direct line of sight between the image (which is co-located with the diffractive surface) and the receiver exists. If image A is a reflective image, step 620 determines whether the line defined by image A and the receiver is unobstructed between the reflective surface of image A and the receiver (the intersection of this line and the reflective surface defining the reflective point) and whether the line from the reflective point to the transmitter is unobstructed—in other words, whether a propagation path exists using image A. If there is a propagation path, a power loss estimation is performed by determining each contribution—i.e., the free space loss across the two path segment lengths and a reflective surface loss. The reflective surface loss may be defined as a set value for all reflective surfaces (e.g., 14 decibels) for simpler calculations; alternatively, where known the reflective characteristics of the materials/structure of each reflective surface may be used, even including an angular factor for certain rough/ irregular surfaces, so that a more precise power loss estimation may be obtained. Similar diffractive characteristics may by used, along with the angle of diffraction, in calculating power loss around diffractive surfaces.

Following step 630, a comparison is made between the power contribution (e.g., initial transmit power times power loss) of the current propagation path and a predetermined threshold. The threshold is preferably set low enough (e.g., a 120 dB drop from the transmit power) to exclude de minimus contributions. If the power contribution of, say image B of FIG. 2, were less than the threshold, no determination of the contribution of its child images (e.g., image D) would be made, since such would necessarily be de minimus too. In this case, the next sibling or same-order image would be set as the current image (e.g., image C) (step 660), and the process repeated. Additionally, the power contribution is also preferably compared against the difference between the cumulative power contributions already determined and a relative threshold (e.g., 20 dB) to exclude de minimus relative contributions; this is useful, e.g., in excluding contributions above the first threshold but still de minimus when short propagation paths with little loss are also present. If the power contribution is greater than both thresholds, then a determination of the contribution of each child/lower order image is then made (670).

This process is repeated (steps 541, 571) until all images on the tree have been examined or excluded by a threshold determination, yielding a received signal quality measure (e.g., received power) cumulated during step 630.

This process is then repeated for all predetermined receiver locations, yielding an estimate of the signal propagation characteristics within the predetermined region of interest of the given transmitter. The region of interest for microcellular systems will be defined typically as all regions within a predetermined radius of the transmitter location that are external to the structures within the region (internal calculations could also be performed, but would require more complex calculations involving power loss based on penetration characteristics). For in-building systems, the region of interest would be limited by the building boundaries. One skilled in the art will appreciate that the accuracy of the signal propagation characteristics is dependent on the number/distance between receiver locations, and how to select an appropriate number based on a balance between factors such as the accuracy desired and the computational capacity/time available. In both cases, the signal power for each receiver site can be used in a variety of ways to determine system planning, for example by factoring together for some overall measure of coverage quality, outputting the receiver locations and powers below a desired received signal level (indicating shadowing or cell boundaries), and displayed for a user so as to show relative receiver powers.

Figure 7:
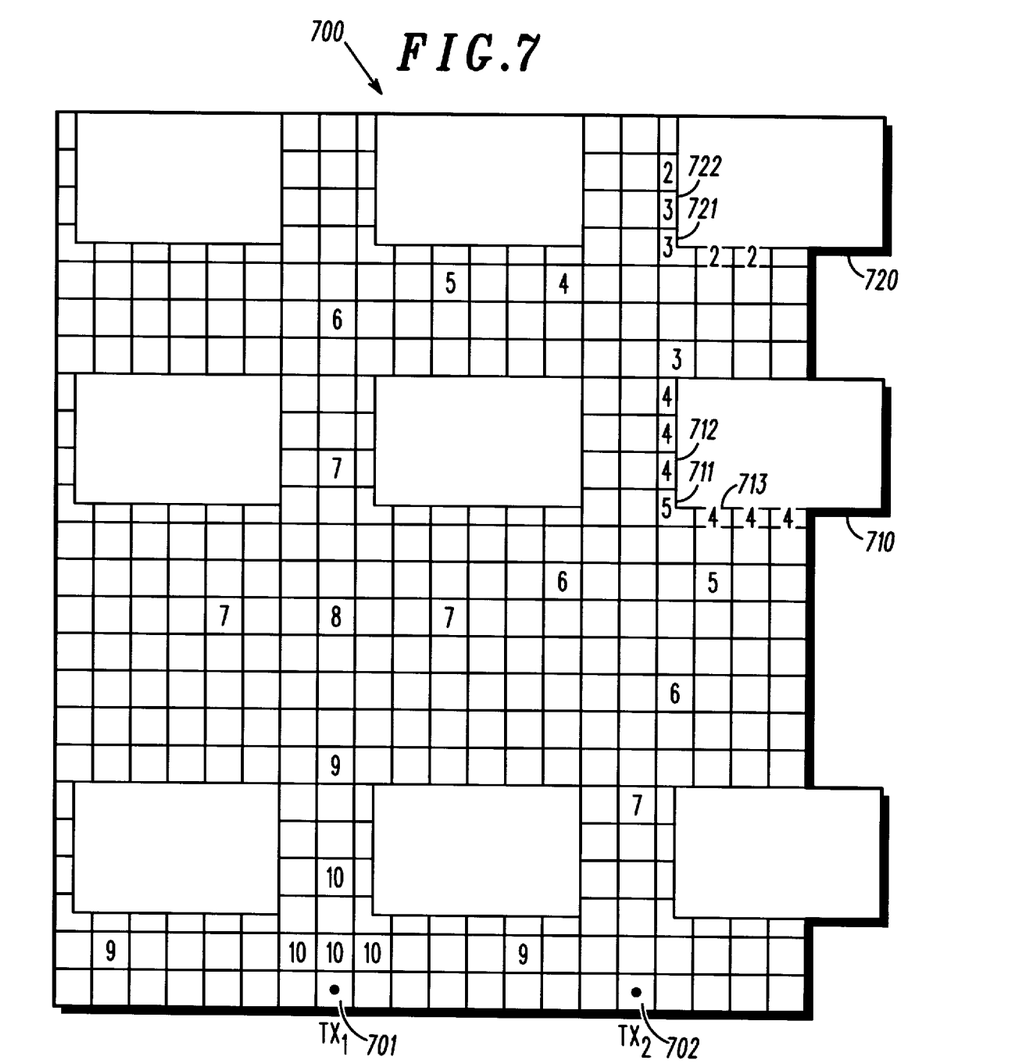
FIG. 7 is a diagram illustrating a plot of received signal powers for a coverage area in accordance with the preferred embodiment of the invention.

This latter approach may be advantageously used in determining the placement for a receiver, such as a wireless fixed access unit (WAFU) for use in PCS (personal communication services) systems. This is illustrated in FIG. 7, where one transmitter location 701 is used to cover a local region 700 such as a residential neighborhood with plural houses 710, 720. Relative received powers is determined for different possible receiver locations, illustrated by areas 711–713 and 721–722. The size of such areas may vary depending on the placement accuracy desired. Further, for ease of determination only relative power levels are displayed (in this case on a scale of 1 to 10, although any scale could be used, including color coding on a computer display). This is sufficient to determine the placement of a WAFU in area 711 adjacent building 710. In cases where the relative display does not provide enough detail, such as for areas 721 and 722 adjacent building 720, which both show a relative power of 3, the actual determined received signal powers in both areas can be displayed so the optimal area can be selected. Finally, where multiple transmitter source locations are possible, e.g., site 702, the entire process can be repeated to determine the receive powers throughout the coverage area based on use of the second transmitter location 702. The results may be compared in a variety of ways, two such being either comparing the coverage for known receiver/subscriber locations (e.g., if only buildings 710 and 720 were likely subscribers, TX 702 would be the preferred site), or assigning an overall coverage rating for the region 700. This latter approach could be realized in many ways, too, including a simple sum of all the receive signal powers in the region for each transmitter and comparing the sums, a determination of the percentage of receive areas that fall below a minimum desired signal power for each transmitter and comparing the percentages, etc.

Thus, it will be apparent to one skilled in the art that there has been provided in accordance with the invention, a method and apparatus of image tree generation and pruning that fully satisfies the objectives and advantages set forth above. While the invention has been described in conjunction with specific embodiments thereof, it is evident that many alterations, modifications, and variations will be apparent to those skilled in the art in light of the foregoing description. Accordingly, the invention is intended to embrace all such alterations, modifications, and variations within the spirit and scope of the appended claims.

We claim:

1. A computer implemented method of determining signal propagation characteristics for a known environment to determine placement of a receiver comprising:
   (a) determining each of plural reflective surfaces and each of plural diffractive surfaces of the known environment;
   (b) determining a first image tree for a first transmitter source location within the known environment by:
      (i) determining first order images of the first image tree, for each of the plural reflective surfaces and each of the plural diffractive surfaces, the first order image of the plural reflective surfaces or the plural diffractive surfaces having a limited scope;
      (ii) determining second and higher order images of the first image tree by repeating step (b)(i), for a predetermined number of reflections and diffractions, such that for each of the plural reflective surfaces and plural diffractive surfaces, respectively, a next order image is determined when the plural reflective surfaces or the plural diffractive surfaces have a scope within the limited scope of the prior order image;
   (c) selecting a first receiver location and back-tracing from the first receiver location using the first image tree to determine each one of plural propagation paths from the first receiver location to the first transmitter source location;
   (d) determining a signal quality change for said each one of plural propagation paths; and
   (e) determining a received signal quality measure at the first receiver location based on the signal quality change for said each one of plural propagation paths for use in the placement of the receiver.

2. The method of claim 1, further comprising:
   (f) repeating steps (c) through (e) for plural further receiver locations using the first image tree to determine a received signal quality measure at all of the first and plural further receiver locations.

3. The method of claim 2, further comprising:
   (g) determining a preferred transceiver location based on the received signal quality measure for all of the first and plural further receiver locations.

4. The method of claim 2, further comprising:
   (g) determining transmitter coverage quality based on the received signal quality measure for all of the first and plural further receiver locations; and
   (h) repeating steps (b) through (g) for plural further transmitter source locations to determine transmitter coverage quality for all of the first and plural further transmitter source locations, and determining a preferred transmitter location based on the transmitter coverage quality for all of the first and plural further transmitter source locations.

5. The method of claim 1, wherein step (a) further comprises determining structural characteristics of each of the plural reflective and diffractive surfaces.

6. The method of claim 5, wherein the structural characteristics for each of the plural reflective surfaces include at least one of the group consisting of location within the known environment and a measure of reflective signal quality loss, and for each of the plural diffractive surfaces include at least one of the group consisting of location within the known environment and a measure of diffractive signal quality loss.

7. The method of claim 6, wherein step (c) back-tracing comprises determining for said each one of plural propagation paths a location of a reflective point for each of the plural reflective surfaces on each one of the plural propagation paths.

8. The method of claim 7, wherein step (d) further comprises, for each one of the plural propagation paths:
   (i) determining path segment lengths using the first transmitter source location, the first receiver location, and locations of each of the diffractive surfaces, and each reflective point on one of said each of the plural reflective surfaces, along said one of the plural propagation paths;
   (ii) determining a signal quality change for each path segment length based on a free space loss characteristic, for each of the diffractive surfaces based on said measure of diffractive signal quality loss, and for each of the reflective points based on said measure of reflective signal quality loss; and
   (iii) determining the signal quality change for said one of the plural propagation paths by summing together each signal quality change for each path segment length, each of said diffractive surfaces and each of said reflective points.

9. The method of claim 7, wherein step (c) further comprises:
   (i) selecting a current image, having a corresponding first surface, of the image tree;
   (ii) determining if the first surface is on a first propagation path to the first receiver location by back-tracing from the first receiver location to the first transmitter source location;
and step (d) further comprises:
   (i) determining path segment lengths using the first transmitter source location, the first receiver location, and locations of each reflective point and each of the diffractive surfaces along the first propagation path;
   (ii) determining a signal quality change for each path segment length based on a free space loss characteristic, for each of the diffractive surfaces based on said measure of diffractive signal quality loss, and for each of the reflective points for each of the plural reflective surfaces based on said measure of reflective signal quality loss, and cumulating each signal quality change determined in a cumulative signal quality change; and
   (iii) when the cumulative signal quality change exceeds a predetermined threshold, stopping the back-tracing of said first propagation path and setting the cumulative signal quality change for the first propagation path to zero contribution;
wherein steps (c) and (d) are repeated for each image, other than any child images of the current image, of the first image tree.

10. The method of claim 9 wherein the signal quality change is a measure of signal power loss.

11. The method of claim 10 wherein step (e) comprises multiplying each measure of signal power loss determined in step (d) by a predetermined signal power level to determine a signal power measure for each of the plural propagation paths, and cumulating each signal power measure determined for each one of the plural propagation paths to form the received signal quality measure.

12. The method of claim 11 wherein step (d) and the step of cumulating each signal power measure in step (e) are performed after said each one of plural propagation paths is back-traced, and step (d)(iii) further comprises, when a difference of the signal power measure cumulated minus a product of the cumulative signal quality change multiplied by the predetermined signal power level exceeds a predetermined relative power threshold, stopping the back-tracing of said one of the plural propagation paths and setting the cumulative signal quality change to zero contribution.

13. The method of claim 1, wherein the predetermined number of reflections and diffractions is equal to two reflections and three diffractions.

14. A computer implemented method of determining signal propagation characteristics for a first transmitter having a first transmitter source location within a known environment having plural reflective surfaces and plural diffractive surfaces, the method utilized to determine placement of a receiver, the method comprising:
   (a) determining a first receiver location and, using a predetermined first image tree for the first transmitter source location, back-tracing from the first receiver location using the predetermined first image tree to determine a location of a reflective point for each of the plural reflective surfaces on one of a plurality of propagation paths, step (a) further comprising;
      (i) selecting a current image, having a corresponding first surface, of the image tree;
      (ii) determining if the first surface is on a first propagation path to the first receiver location by back-tracing from the first receiver location to the first transmitter source location;
   (b) determining a signal quality change for each of the plural propagation paths, step (b) further comprising;
      (i) determining path segment lengths using the first transmitter source location, the first receiver location, and locations of each reflective point and each of the diffractive surfaces along the first propagation path;
      (ii) determining a signal quality change for each path segment length based on a free space loss characteristic, for each of the diffractive surfaces based on said measure of diffractive signal quality loss, and for each of the reflective points for each of the plural reflective surfaces based on said measure of reflective signal quality loss, and cumulating each signal quality change determined in a cumulative signal quality change; and
      (iii) when the cumulative signal quality change exceeds a predetermined threshold, stopping the back-tracing of said first propagation path and setting the cumulative signal quality change for the first propagation path to zero contribution; and
   (c) determining a received signal quality measure at the first receiver location based on the signal quality change for each of the plural propagation paths for use in the placement of the receiver.

15. The method of claim 14, further comprising:
   (d) repeating steps (a) through (c) for plural further receiver locations using the predetermined first image tree to determine a received signal quality measure at all of the first and plural further receiver locations.

16. The method of claim 15, further comprising:
   (e) determining a preferred transceiver location based on the received signal quality measure for all of the first and plural further receiver locations.

17. The method of claim 15, further comprising:
   (e) determining transmitter coverage quality based on the received signal quality measure for all of the first and plural further receiver locations; and (f) repeating steps (a) through (e) for plural further transmitter source locations to determine transmitter coverage quality for all of the first and plural further transmitter source locations, and determining a preferred transmitter location based on the transmitter coverage quality for all of the first and plural further transmitter source locations.

18. A computer implemented method of determining an image tree for use in determining signal propagation characteristics for a known environment to determine placement of a receiver, the image tree associated with a source having a location within the known environment, the known environment having plural reflective surfaces and plural diffractive surfaces, comprising:

(i) determining first order images of the first image tree by determining, for each of the plural reflective surfaces and each of the plural diffractive surfaces, respectively, the first order image having a limited scope;

(ii) determining second and higher order images of the image tree by repeating step (i), for a predetermined number of reflections and diffractions, such that for each of the plural reflective surfaces and plural diffractive surfaces, respectively, a next order image is determined when the plural reflective surfaces or the plural diffractive surfaces have a scope within the limited scope of the prior order image for use in the placement of the receiver.

* * * * *